United States Patent
Zhang et al.

(10) Patent No.: US 10,549,924 B2
(45) Date of Patent: Feb. 4, 2020

(54) ROBOTIC ARTICLE COLLATION AND METERING ASSEMBLY

(71) Applicant: Douglas Machine Inc., Alexandria, MN (US)

(72) Inventors: Tao Zhang, Alexandria, MN (US); Richard W. Lukanen, Jr., Alexandria, MN (US)

(73) Assignee: Douglas Machine Inc., Alexandria, MN (US)

( * ) Notice: Subject to any disclaimer, the term of this patent is extended or adjusted under 35 U.S.C. 154(b) by 0 days.

(21) Appl. No.: 16/015,751

(22) Filed: Jun. 22, 2018

(65) Prior Publication Data
US 2019/0389668 A1    Dec. 26, 2019

(51) Int. Cl.
*B65G 47/29* (2006.01)

(52) U.S. Cl.
CPC ...... *B65G 47/29* (2013.01); *B65G 2201/0244* (2013.01); *B65G 2201/0252* (2013.01); *B65G 2201/0258* (2013.01); *B65G 2811/0621* (2013.01)

(58) Field of Classification Search
CPC ...... B65G 47/29; B65G 47/295; B65G 25/00; B65G 25/02
USPC ..... 198/419.1, 418.8, 740, 430, 520, 468.01
See application file for complete search history.

(56) References Cited

U.S. PATENT DOCUMENTS

| | | | |
|---|---|---|---|
| 4,660,711 A * | 4/1987 | Alonso | B65G 47/82 198/430 |
| 4,832,178 A | 5/1989 | Anderson et al. | |
| 5,147,027 A | 9/1992 | Cruver | |
| 5,201,823 A | 4/1993 | Pazdernik | |
| 5,842,558 A * | 12/1998 | Spatafora | B65G 47/82 198/468.01 |
| 6,213,290 B1 * | 4/2001 | Biondi | B65G 47/082 198/468.1 |
| 6,843,360 B2 | 1/2005 | Peterman et al. | |
| 6,948,608 B2 * | 9/2005 | Monti | B25J 9/0093 198/426 |
| 7,222,716 B2 | 5/2007 | Peterman et al. | |
| 7,533,768 B2 | 5/2009 | Peterman et al. | |
| 7,726,463 B2 | 6/2010 | Aronsson | |
| 7,815,034 B2 * | 10/2010 | Fleck | B65G 47/088 198/418.7 |

(Continued)

FOREIGN PATENT DOCUMENTS

WO    2009124026    10/2009
WO    2017041007    3/2017

*Primary Examiner* — William R Harp
(74) *Attorney, Agent, or Firm* — Dicke, Billig & Czaja, PLLC (57) ABSTRACT

An article metering assembly for forming of an article group from a downstream most end portion of a bulk flow of conveyed articles is generally provided. The assembly, in one embodiment, is characterized by a robotic arm, a linkage assembly, and an end effector operatively united with the robotic arm and the linkage assembly such that the end effector is fixedly orientated relative to and overhead of the bulk flow of articles throughout a robotic arm motion cycle. Alternately, the assembly is characterized by a robotic arm in operative combination with an end effector, the end effector selectively oriented in relation to articles of a bulk flow of article during travel about its travel path in furtherance of forming an article group from above.

33 Claims, 6 Drawing Sheets

(56) References Cited

U.S. PATENT DOCUMENTS

| | | |
|---|---|---|
| 8,011,495 B2 | 9/2011 | Anderson et al. |
| 8,113,335 B2 | 2/2012 | Aronsson |
| 8,672,117 B2 | 3/2014 | Stahl |
| 9,315,338 B2 | 4/2016 | Peterman et al. |
| 9,751,700 B2 | 9/2017 | Peterman et al. |
| 2011/0067975 A1 | 3/2011 | Pazdernik |
| 2014/0262685 A1 | 9/2014 | Job et al. |
| 2015/0090643 A1 | 4/2015 | Struijk et al. |

\* cited by examiner

ROBOTIC ARTICLE COLLATION AND METERING ASSEMBLY

TECHNICAL FIELD

The present invention generally relates to article collation and metering, more particularly, to assemblies, apparatus, systems and/or methods for metering articles from a flowing article stream into an article group (e.g., a preselect pack patterned group) in advance of case loading/packing operations), more particularly still, to article collation and metering via robotic means equipped with an insertion tool insertable into an end portion of a bulk flow of conveyed articles from above.

BACKGROUND OF THE INVENTION

In a typical packing operation, articles (i.e., "products") approach a case packing station or the like via a flowing article stream (e.g., a continuous, semi-continuous, or batch continuous stream having origins in an upstream bulk flow of articles). As such operations/processing lines are more often than not intended to aggregate articles in multiples in furtherance of establishing a multi-pack of articles, e.g., multi-pack cases (e.g., 6, 12, 24 article packs or bundles), stacked trays of arrayed articles, etc., it is necessary to manage, prepare or ready the inflow stream of articles so as to separate the articles into groups or select groups (i.e., for a collated article corresponding to a preselect pack pattern consistent with the case packing objective) as is generally well known. Once grouped or collated, the article group or set may be further processed, such as by being film or corrugated over-wrapped. Notionally, article metering, article separation and collation, and article group loading (e.g., case or carton loading) are requisite steps attendant to a majority of article packaging operations.

Generally, articles are sequentially passed to and through a variety of work stations whereupon the articles are operated upon in furtherance of metering, grouping, spacing apart the groupings, and/or packing/bundling etc. Commonly, a series of conveying mechanisms, e.g., step operated belt conveyors or the like, are provided to transport or selectively transport the articles. For example, and by way of illustration, conveyance mechanisms may be provided in connection to article supply, article infeed, article group sweep/outfeed.

Conveyance and operational or functional transition points generally require attention, care and management. For instance, article conveyance may be specifically arrested via a holding belt or belts as taught by Cruver (U.S. Pat. No. 5,147,027), or via a retaining member or retaining device as taught by Aronsson (U.S. Pat. Nos. 7,726,463 & 8,113,335, respectively), in advance of article grouping via a metering station characterized by track mounted metering pins or bars which engage either or both of a trailing or leading article group "face" during travel about a fixed travel path delimited by the track. Ramifications of such arrest or selective retention are varied, primarily a function of the character of article, e.g., its compressibility or notionally it elasticity, as well as its configuration/center of gravity, etc.). Typically, the "cost" of surge management has been the use of dedicated arresting/retention devices and an attendant methodical, discrete processing step which generally slows article processing.

As to article metering and/or metering and separation operations, approaches disclosed by Peterman et al. (U.S. Pat. Nos. 6,843,360, 7,222,716 & 7,533,768) and Pundsack et al. (WO 2009/124026 A1) generally improve upon, among others, the approaches noted above. The manner of metering and separating product described and shown, namely, one characterized by, among other things, a stationary or fixed transfer plate bridging infeed and sweep conveyors, a product or article transfer device (e.g., a "slip") and/or a "control device" for at least registering a leading edge or face of the article group on the transfer device or the like, has enjoyed considerable market success, and is generally recognized as a differentiated approach to heretofore known operations.

In addition to being a known, welcome improvement over heretofore incremental advances in or with regard to prior pin metering devices, e.g., see the work of Pazdernik (U.S. Pat. No. 5,201,823) and Anderson et al. (U.S. Pat. No. 4,832,178) which generally and notionally create a select spaced apart condition for and between articles via the imposition of pins between adjacent articles from below, pins which function to restrain an upstream article of adjacent articles while advancing (e.g., pushing) the downstream article of the adjacent articles, the article transfer device is an elegant solution in furtherance of improved processing speed, via among other things, the elimination of article infeed arresting and its inherent stop/start interval. Moreover, further advances embodied in dual slip sheet approaches, such as that disclosed by Pazdernik (U.S. Pub. No. US 2011/0067975), and in an endless loop (i.e., non-retractable) slip sheet, such as that disclosed by Anderson et al. (U.S. Pat. No. 8,011,495), have likewise enjoyed, and continue to enjoy commercial success.

With current metering/metering-separating approaches characterized by track supported metering bars, alignment bars, sweep bars, dual function align-sweep bars, for select engagement of articles part-and-parcel of article grouping operations (e.g., Cruver, Aronsson, Peterman et al. & Pundsack et al.) considered to be welcomed improvements relative to pin metering from below, issues nonetheless remain with regard to operational flexibility, repeatability, changeover, throughput, surge management, and overall process control vis-a-vis improved operative control linkages for, with, between and among the sought after processing operations.

Trackless metering/metering separating has emerged to address a variety of shortcomings of prior track based metering solutions, with advances predicated upon the use of industrial robots. For instance, Applicant's prior work, U.S. Pat. No. 9,315,338 (Peterman et al.), generally and notionally provide a parallel robot, e.g., a delta 2 robot, equipped with an end effector for travel over and into a downstream-most portion of a bulk flow of articles to effectuate sought after article collation and metering. While universally viewed as a welcome cost effective advance over prior approaches in this processing area, Applicant has since directed efforts to improving, among other things, throughput and surge control.

For example, processing versatility remains desirable owing to the disparate character or configuration of or for the articles (e.g., can, bottle, jug, tray, etc.), the size or capacity of the articles (e.g., volume or mass), and/or the character of the article contents, i.e., the nature of the product (e.g., solid, aggregate, liquid (carbonated, non-carbonated)). Moreover, even for a select article processing run, both product and operational conditions may be varied or variable throughout the run owning to, among other things, a lack of homogeneity in the articles of the bulk article flow, or the character of the conveying surfaces of the conveying mechanisms of the line due to spills, periodic wash downs, etc. Further still, with multi-axis robots having enjoyed wide spread use, leveraging multi-axis robot versatility and precision while retaining high speed operation for a robust trackless pin metering approach from above, without breaking the bank, remains a desirable objective and marketplace aim.

In light of the foregoing operational and/or system approaches with regard to article conveying, metering, grouping, and group separation, and presently perceived shortcomings associated with article collation and metering which impact both upstream and downstream operations, it is believed advantageous to provide, among other things, a higher degree of precision, repeatability, product stability, and speed to robotic metering operations. More particularly, it is believed advantageous to eliminate some mechanization from higher degree mechanized multi-axis robots, to provide a system adapted to readily accommodate article surge, and to reliably and repeatedly guide an end effector through a select travel path at select travel rates throughout portions or segments of the travel path, and to have the end effector selectively approach/exit a downstream most end portion of a bulk flow of conveyed articles from above.

SUMMARY OF THE INVENTION

An article metering assembly for forming of an article group from a downstream most end portion of a bulk flow of conveyed articles is generally provided. The assembly is advantageously but not necessarily characterized by a robotic arm, a linkage assembly, and an end effector operatively united with the robotic arm and the linkage assembly such that the end effector is fixedly orientated relative to and overhead of the bulk flow of articles throughout a robotic arm motion cycle. The robotic arm is characterized by first and second arm segments and proximal, intermediate and distal arm joints, the first arm segment extending between the proximal arm joint and said distal arm joint, the second arm segment extending between the intermediate arm joint and the distal arm joint. Elevation changes for the end effector, relative to the bulk flow of conveyed articles, are effectuated by the robotic arm, an orientation for the end effector effectuated by the linkage assembly.

Advantageously, the end effector of the assembly is supported at the distal arm joint of the robotic arm, a joint pivotable relative to/about the end effector upon pivoting of the second arm segment about the intermediate arm joint, more particularly, the distal arm joint is characterized by a bearing set, the end effector operatively extending therefrom. The linkage assembly generally includes fixed and pivotable link segments. Fixed links or link segments are centrally and distally supported by the robotic arm, with pivotable links or link segments adjacent the arm segments of the robotic arm. Via, among other things, select operative union of the linkage assembly with the robotic arm, while the end effector travels in x-y space within a working envelope, an orientation for the end effector, relative to the bulk flow of articles thereunder, remains fixed.

In a further contemplated embodiment, the assembly omits the linkage assembly, with the robotic arm adapted such that the end effector is directly actuatable. More particularly, the distal arm joint of the robotic arm drivingly carries the end effector for pivot motion (i.e., rotation), the end effector thus directly and selectively positionable (i.e., capable of select varied or variable angular orientation during travel about a travel path within a working envelope).

In addition to an assembly, an article metering apparatus for forming an article group from a downstream most end portion of a bulk flow of conveyed articles is further contemplated, as is a metering station so characterized. The apparatus is characterized by synchronously operated article metering assemblies, each article metering assembly of the article metering assemblies advantageously but not necessarily including a robotic arm, a linkage assembly, and an insertion tool operatively supported by the robotic arm and operatively united with the link assembly, the insertion tool having a fixed orientation relative to articles of the bulk flow of conveyed articles during operation of the robotic arm. The robotic arm includes a pivoting upper arm segment, a pivoting lower arm segment, and a joint uniting the arm segments, the pivoting upper arm segment depending from a support member. The linkage assembly includes an upper link, a central link, and a lower link portion, the central link supported by the robotic arm at the joint, the upper link pivotingly extending, in a spaced apart parallel condition relative to the pivoting upper arm segment, between the support member and the central link. Moreover, an article metering apparatus characterized by synchronously operated article metering assemblies wherein each article metering assembly includes a robotic arm and an insertion tool operatively supported by the robotic arm and driven by a portion thereof is likewise contemplated.

Finally, an advantageous robotic article collation and metering method is contemplated and provide. The method is characterized by paired selective compliance assembly robot arms, each arm of the selective compliance assembly robot arms equipped with an end effector. Each end effector selectively and alternately engages a downstream most end portion of a bulk flow of conveyed articles from above in furtherance of forming and releasing an article group from the downstream most end portion of a bulk flow of conveyed articles.

The method includes providing a control unit operatively linked with the paired selective compliance assembly robot arms in furtherance of establishing a select travel path for the end effector of the robotic arm, and rates of travel for the end effector about the select travel path. A select travel path for the end effector of the robotic arm is established and characterized by x and y travel components, the select travel path in turn characterized by a conveyed article ingress portion and a conveyed article egress portion for the end effector. The end effector is cooperatively engaged with articles of the bulk flow of conveyed articles between the conveyed article ingress and egress portions. An article group from the downstream most end portion of a bulk flow of conveyed articles is delimited via introduction of the end effector into a segment of the downstream most end portion of a bulk flow of conveyed articles as a result of end effector travel along the conveyed article ingress portion. An x travel component rate of the end effector along the conveyed article ingress portion substantially matches a bulk flow rate of the bulk flow of conveyed articles. A y component rate of the end effector along the conveyed article ingress portion is a decelerating rate. More specific features and advantages obtained in view of those features will become apparent with reference to the drawing figures and DETAILED DESCRIPTION OF THE INVENTION.

All figures have been prepared to facilitate and/or enhance an understanding of the basic teachings of the present invention, and/or the concepts underlying same. Extensions of the figures with respect to number, position, relationship, and dimensions of the parts to form one or more preferred embodiments or variants thereof may be explained or is understood to be within the skill of the art after the following description has been read and understood. Further, the exact dimensions and dimensional proportions to conform to specific force, weight, strength, and similar requirements relative to, e.g., processing objectives, will likewise be within the skill of the art after the following description has been read and understood.

Where used in the various figures of the drawings, the same numerals designate the same or similar parts. Furthermore, when the terms "side," "end," "bottom," "first," "second," "laterally," "longitudinally," "row," "column," and similar terms are used herein, it should be understood that these terms have reference only to the structure shown in the drawings as it would appear to a person viewing the drawings and are utilized only to facilitate describing illustrative embodiments or variants thereof.

DETAILED DESCRIPTION OF THE INVENTION

Figure 1:
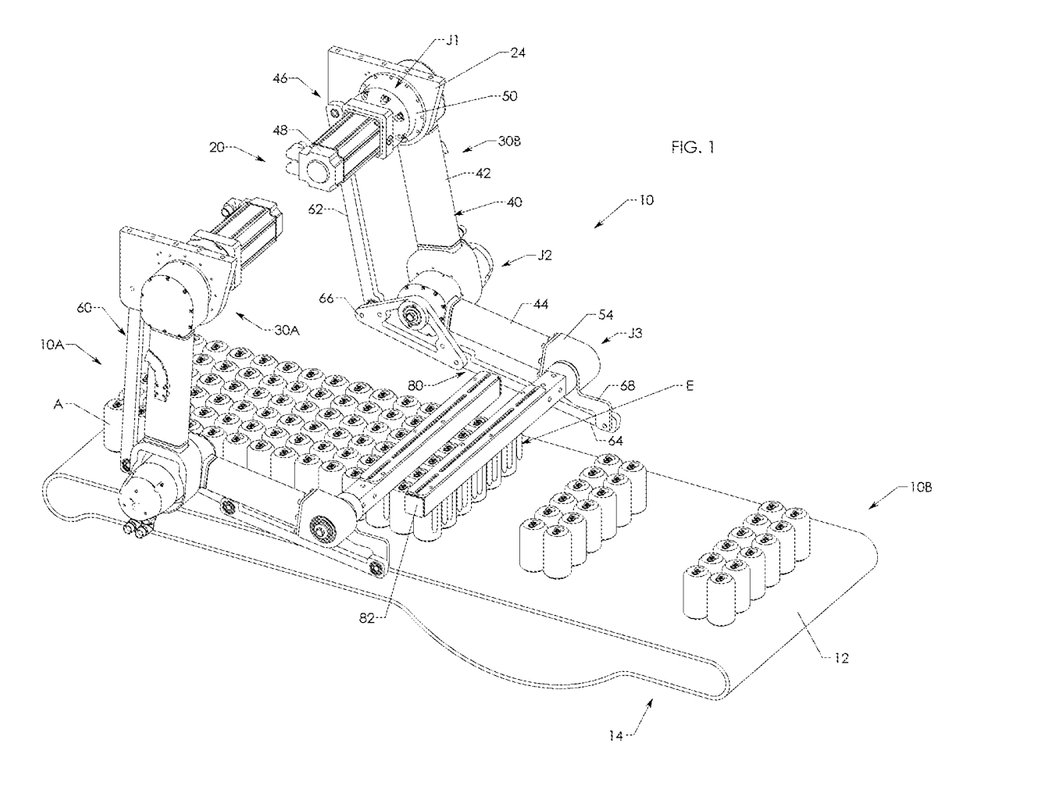
FIG. 1 depicts a representative, non-limiting article metering station, perspective view slightly from above downstream vantage point, characterized by a conveyor section and an article collation and metering apparatus operating upon a bulk flow of articles, article flow right to left.
Figure 2:
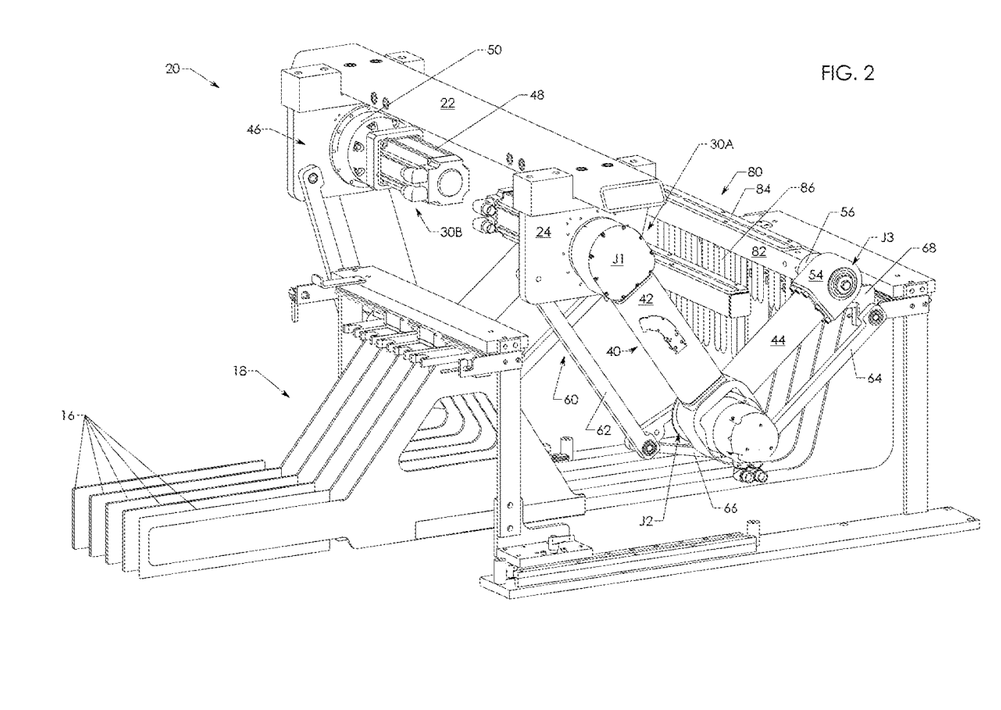
FIG. 2 depicts the article collation and metering apparatus of FIG. 1, perspective view, slightly from above upstream vantage point, in relation to lane dividers of an article metering station.
Figure 3:
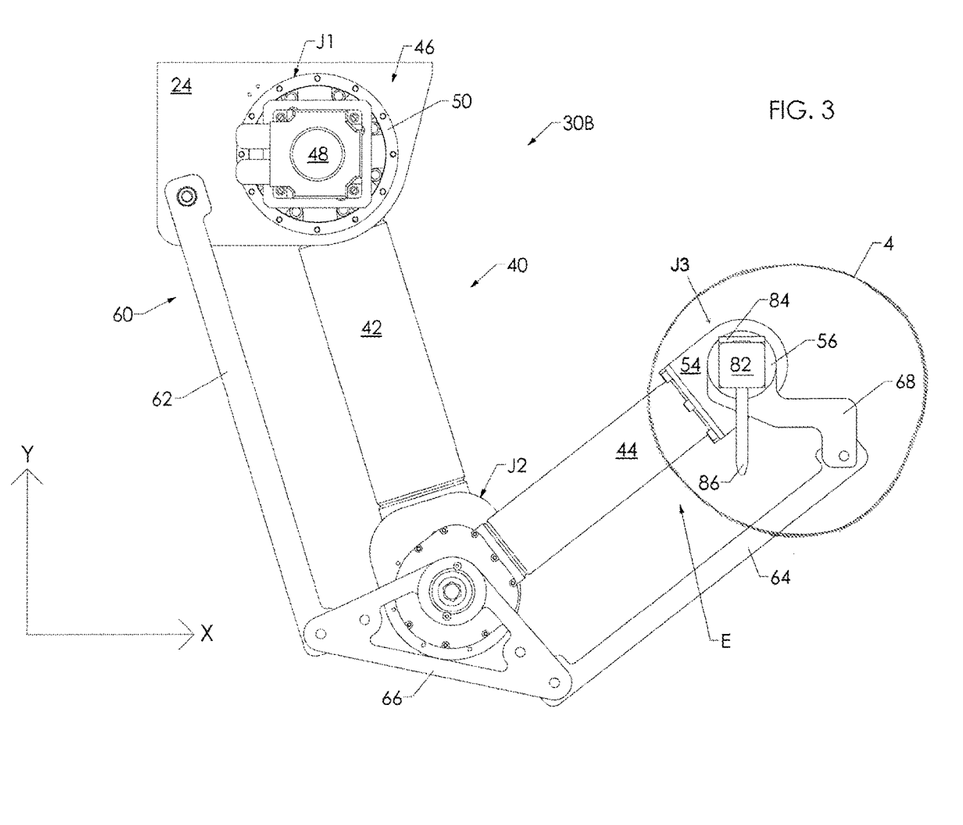
FIG. 3 illustrates, side elevation interior view, a "far" article metering assembly of far and near article metering assemblies of the article collation and metering apparatus of FIG. 2.
Figure 4:
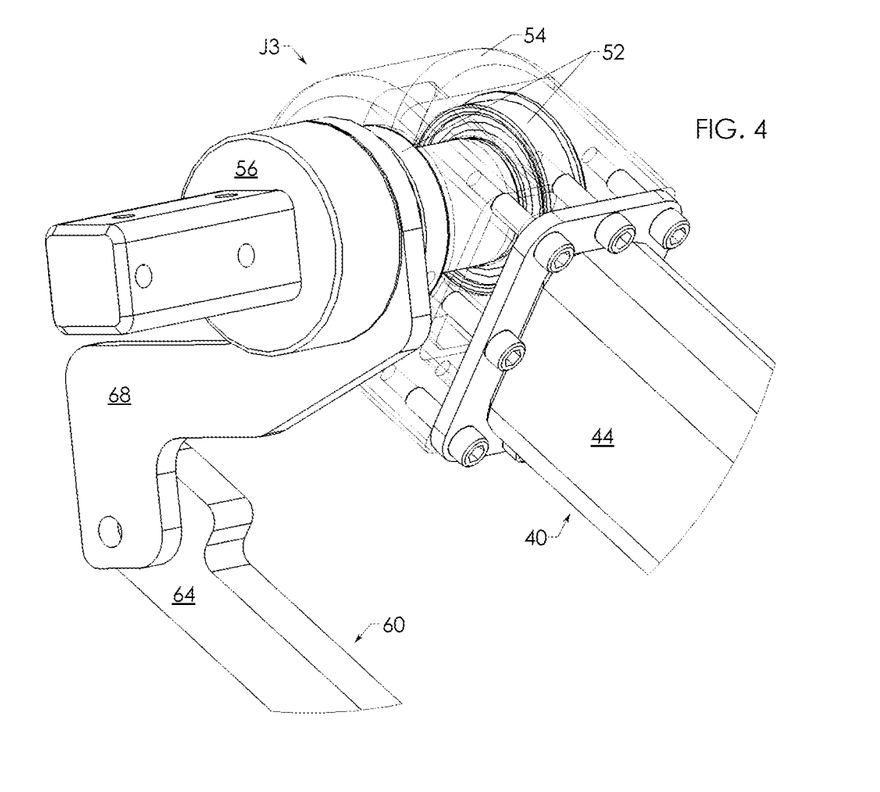
FIG. 4 illustrates details of area 4 of FIG. 3, select parts of the FIG. 3 assembly omitted or rendered transparent, namely, particulars of a distal robotic arm joint and its relationship with the end effector are shown.
Figure 5:
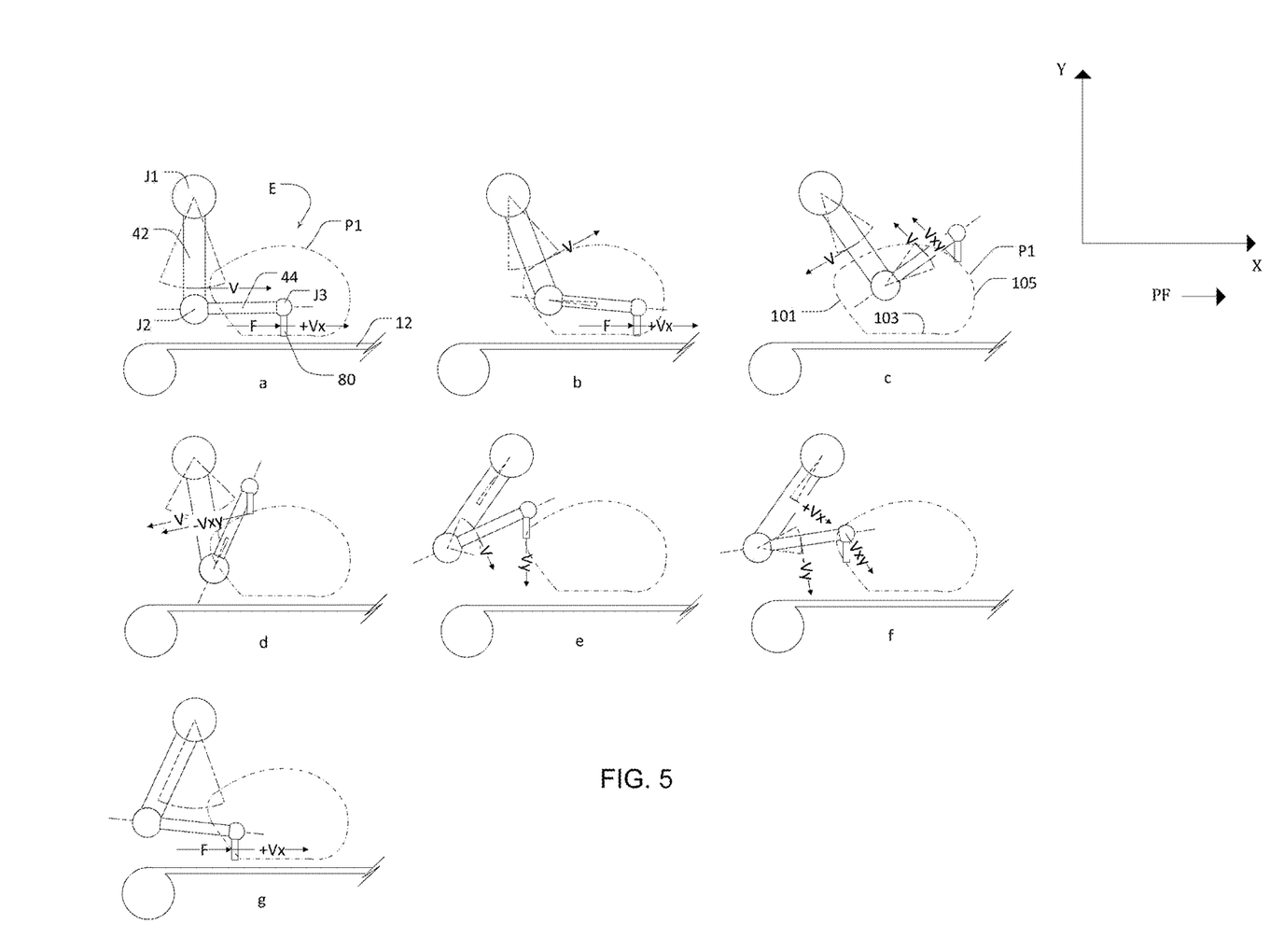
FIG. 5, sequence a-g, illustrates an advantageous orbital path for the end effector or tool of the article metering assembly along with kinematics of the robotic arm of the assembly having a first advantageous configuration or arrangement; and, FIG. 6, sequence a-g, again illustrates the advantageous orbital path for the end effector or tool of the article metering assembly along with kinematics of the robotic arm of the assembly having an alternate configuration or arrangement relative to that depicted FIG. 5.

Applicant's contemplated metering approach is generally appreciated with reference to FIGS. 1, 2 & 5 (and alternately, relative to FIG. 5, with reference to FIG. 6), with particulars thereof depicted in FIG. 3, select further FIG. 3 particulars illustrated in FIG. 4. More particularly, an advantageous, non-limiting article metering station is generally depicted FIG. 1, an advantageous, non-limiting article metering apparatus is depicted FIG. 2, and an advantageous, non-limiting article metering assembly is depicted FIG. 3, with details of a distal robotic arm joint and its relation to other assembly components depicted FIG. 4. Motion sequences associated with an advantageous orbital path for an end effector or tool of the article metering apparatus are illustrated FIG. 5, with the same advantageous orbital path illustrated FIG. 6, effectuated via an alternate robotic arm configuration/arrangement relative to the FIG. 5 depiction.

As will be subsequently developed, notionally, robust robotic mechanisms, characterized by a common, narrowly tailored working envelope, coordinatingly operate upon a downstream most portion of a bulk flow article stream via sequential overhead imposition of a tool carried thereby (i.e., a suitable outfitted or equipped end effector), with alternating "hold" (i.e., ingress-engage) and "release" (i.e., egress-disengage) modes for each mechanism permitting on-the-go swift and reliable article group formation. Horizontal and vertical robotic arm motions are coordinated via a controller operative linked thereto in furtherance of establishing an advantageous end effector travel path delimited by a parametric curve, a zero contact force release (a/k/a "feather touch") enabled, namely, and among other things, an acceleration of/for the end effector leading up to and concluding with article group release is matched to a sweep conveyor surge acceleration. More particularly, during travel along a conveyed article ingress portion of the end effector travel path, an x travel path rate substantially matches a bulk flow rate of the bulk flow of the conveyed articles, a y travel path rate for the end effector along this travel portion being a deceleration rate.

With initial reference to the article metering station 10 of FIG. 1, characteristic elements or components are depicted. More particularly, an endless belt 12 of a conveyor apparatus or system is shown, articles A operatively supported thereupon and advantageously guided via lanes 16 of a lane system 18 (FIG. 2), in furtherance of both maintaining/establishing a bulk flow article stream at station ingress 10A, and spaced apart metered, metered/collated article groups at station egress 10B. Advantageously, but not necessarily, a slip sheet or the like, in keeping with Applicant's earlier teaching (e.g., U.S. Pat. No. 9,315,338, incorporated herein by reference in its entirety), may be part-and-parcel of the conveyor apparatus or subassembly to aid gap forming operations. Finally, an article metering apparatus 20 characterized by paired article metering assemblies 30A, 30B, delimiting a working envelope E (see especially FIG. 5), for operating upon a downstream most portion of the bulk flow article stream is likewise shown.

While notionally conventional, the endless belt is advantageously selected to permit continued downstream advancement of the bulk flow of articles from an upstream source and downstream advancement of the later formed article groups, and to permit passage of the belt under the bulk flow of articles within the working envelope of the article metering assembly (i.e., during metering operations). In addition to advantageous, non-limiting belting from Rexnord Flat Top Conveying Solutions, Grafton, Wis., USA (i.e., Rexnord MatTop Chain), the HABASITLINK modular belt from Habasit AG Reinach-Basel Switzerland, more particularly, a HABASITLINK M1230 Flush Grid 0.5", POM-PP provides the sought after functionality.

With continued reference to FIGS. 1 & 2, and select reference to FIG. 3, attention is specifically directed to the non-limiting depiction of contemplated article metering apparatus 20 of FIG. 1 station 10. Article metering apparatus 20 is characterized by an article metering assemblies, more particularly, paired article metering assemblies 30A, 30B as shown. While not shown, a control unit, advantageously part-and-parcel of a process management or control system for the station of FIG. 1, is operatively linked to the assemblies in furtherance of establishing, among other things, a select travel path for the robotic arm and attendant route segment travel rates and/or changes in respect of select rates. Moreover, the article metering system (e.g., the station) may advantageously, but not necessarily further include, or be characterized by a load monitoring/sensing system, advantageously in the form of a surge feedback control. Load monitoring and/or sensing is undertaken in connection to the drive assembly of the article metering apparatus, via, e.g., current sensing via program logic controller of servo motor drives associated with the robotic arms, with control of another process system parameter, for instance, a conveyor of the conveyor section, selectively effectuated to manage (i.e., relieve) bulk flow article surge, and thus eliminate or at least reduce surge related process flow stoppages/aberrations.

The assemblies generally depend from a support member 22 of a structural assembly or frame (not shown) of apparatus 20, more particularly, from an assembly base 24 as shown, support member 22 in an elevated condition relative to endless belt 12, and traversing same (i.e., transversely extending thereacross). The assemblies are synchronously or otherwise operated to effectuate sought after performance objectives as will be subsequently outlined.

Each depicted assembly includes a robotic arm 40, a linkage assembly 60, and an end effector 80 operatively united with the robotic arm and the linkage assembly such that the end effector is fixedly orientated throughout a robotic arm motion cycle. Advantageously, the robotic arm comprises a selective compliance assembly robot arm (SCARA). Notionally, the robotic arm extends from the assembly support structure, and via the depending linkage assembly, facilitates establishment of a select, advantageous travel path P1 (see e.g., FIG. 5) and orientation for the end effector carried or otherwise supported by the robotic arm. Contrariwise, a further contemplated, alternate assembly omits the linkage assembly, the robotic arm adapted in furtherance of enabling a direct driven end effector, namely, a pivotable or rotatable end effector which may be actuated during travel about a travel path in furtherance of establishing a select advantageous orientation for the end effector relative to the article of the bulk flow of articles.

With particular reference now to FIG. 3, each robotic arm 40A, 40B of corresponding assembly 30A, 30B of article metering apparatus 20 of FIG. 2 is characterized by first 42 and second 44 arm segments, and three arm joints J1, J2, & J3. A first arm joint (J1) is a proximal (i.e., base) arm joint, second arm joint (J2) is an intermediate arm joint, and third arm joint (J3) is a distal (i.e., free-end) arm joint which operatively supports end effector 80. First arm segment 42 is an "upper" arm segment extending between arm joints J1 & J2, the upper arm segment pivotable in two dimensions relative to robotic arm base 24 (i.e., x-y dimension as indicated FIG. 3). Second arm segment 44 is a "lower" arm segment extending between arm joints J2 & J3, the lower arm segment pivotable in two dimensions relative to upper arm segment 42.

Each of joints J1 and J2 is adapted to operatively support a drive assembly 46 in furtherance of effectuating pivot motion for upper and lower arm segments 42, 44. Moreover, J3 may likewise adapted in furtherance of directly effectuating a pivot motion for the end effector in an alternate embodiment of the robotic arm wherein the linkage assembly is omitted.

Drive assembly 46 is generally characterized by a motor 48, gear box 50 and a controller (not shown). Joint J3 functions to support the end effector, and is adapted to rotate about the end effector which is fixedly maintained in a select orientation relative to the bulk article flow in this scenario via an operative combination with the linkage assembly. More particularly, the robotic arm positions the end effector in two-dimensional x-y space, with the linkage assembly effectuating a fixed orientation for the traveling end effector, more particularly, a fixed orientation for an insertion tool of the end effector relative to the bulk flow of articles thereunder is effectuated.

With reference now to FIG. 5, there is shown an advantageous, non-limiting configuration or arrangement of the robotic arm in keeping with the FIG. 1 depiction of same. The robotic arm advantageously, but not necessarily, is positioned so as to be extendable in a downstream process flow direction (i.e., left to right as shown, J1 upstream of working envelope E). An alternate configuration (not depicted) positions the robotic arm so as to be extendable in a upstream process flow direction (i.e., right to left as shown, J1 downstream of the working envelope). Moreover, the robotic arm advantageously, but not necessarily, is arranged such that J1 is an upper most robotic arm joint as per FIG. 5, with an alternate arrangement positioning or orienting J1 as a lower most robotic arm joint (see FIG. 6).

In terms of an x-y coordinate system relative to the endless belt, robotic arm joint J1 is an uppermost arm joint (i.e., +y-max joint), with joint J3 being a downstream most arm joint (i.e., +x-max joint). Joint J2 travels through a travel path (e.g., path P2 (not shown)), owing to pivoting of the upper arm at joint J1, and is an upstream most joint (i.e., a −x-max joint) when the end effector is "holding" a downstream most bulk article flow portion, and, is, at downstream most extent of P2 (i.e., when the end effector is releasing an article group from the bulk article flow), a +x distance/orientation relative to joint J1. Joint J3, as joint J2, travels through a travel path (e.g., path P3 (not shown)), owing to pivoting of the lower arm via joint J2, and is an lowermost joint (i.e., −y-max joint) during downstream travel of joint J2, and is a +y distance/orientation relative to joint J2 during upstream travel of joint J2.

As to the robotic arm segments, some general observations are worth noting. Generally, but not necessarily, upper arm segment 42 pivots through a sweep of about 90 degrees, namely, +/−about 45 degrees from vertical in effectuating positioning of J2 along travel path P2. Generally, but not necessarily, lower arm segment 44 pivots through a sweep of about 45 degrees, namely, about +45 degrees from horizontal. Notionally, J3 follows the x-y path; for a given position on/at travel path P1, there is a unique combination of angles associated with J1, J2 effectuating the 2D coordinate space local. Depicted robotic arm motions, kinematics, and end effector travel path P will be taken up subsequent to further particulars for the article metering assembly.

With renewed reference to FIG. 3, linkage assembly 60 is notionally characterized by links or linkage segments fixedly supported by the robotic arm at arm joints thereof, and pivotable links or linkage segments, operably supported part-and-parcel of the assembly, so as to maintain a parallel spaced apart relationship with each of the upper and lower arm segments. The linkage assembly, in combination with an adaptation of the distal arm joint, permits the elimination of a drive assembly at the distal arm joint while nonetheless effectuating a desirable and advantageous travel path and orientation for the end effector relative to the bulk flow of articles. It should be readily appreciated that in lieu of the contemplated linkage assembly, J3 may be adapted to include its own drive assembly, as per each of J1 and J2, an angular orientation of an end effector depending therefrom thusly directly and selectively controllable.

Advantageously, but not exclusively, linkage assembly 60 may be fairly characterized by a first (i.e., upper) link or linkage segment 62, a second (i.e., lower) link or linkage segment 64, a central link 66 and a distal link 68. Central link 66 is fixedly supported by robotic arm 40 at intermediate arm joint J2, and distal link 68 is fixedly supported by robotic arm 40 at distal arm joint J3. As will be later taken up, the first 62 and second 64 links are each pivotably supported at their ends. Linkage assembly 60 extends from assembly base 24, via first/upper link 62, to distal arm joint J3, via distal link 68.

Central link 66 of linkage assembly 60 is interposed between the first 62 and second 64 links and is advantageously configured as a triangle, central link 66 fixedly supported by robotic arm 40, via its apex, to intermediate arm joint J2. Opposing vertices of central link 66 pivotingly support ends of the first 62 and second 64 links. First/upper link 62 extends in a parallel spaced apart condition relative to upper arm segment 42 of robotic arm 40, from central link 66, to base/robotic arm support 24 of structure 22 wherein it is pivotingly mounted or otherwise received in a spaced apart condition relative to an axial centerline of joint J1 of the supported robotic arm.

Distal link 68 of linkage assembly 60 is fixedly supported at the free end of the lower arm segment 44 of robotic arm 40 so as to extend therefrom, more particularly, distal link 68 is interposed between end effector 80 and distal arm joint J3. Second link 64 unites distal 68 and central 66 links, second link 64 pivotingly extending there between so as to be in a parallel spaced apart condition relative to lower arm segment 44 of robotic arm 40.

With reference now to FIG. 4, relative motion for and between distal arm joint J3 and end effector 80 is contemplated, namely, a pivot or rotational motion is advantageously effectuated via an adaptation of the distal arm joint. As shown, a bearing set 52 is carried by a housing 54 of distal arm joint J3. A mounting fixture 56 is advantageously but not necessarily contemplated, the mounting retainingly received, at one end thereof, by bearing set 52, with a free end of mount 56 adapted to receive and retain end effector 80.

With renewed reference to FIG. 2, and continued reference to FIG. 4, end effector 80 is advantageously, but not necessarily characterized by a structural member 82 and an insertion tool 84 depending therefrom. Structural member 82 extends, advantageously but not necessarily, as shown, indirectly from distal arm joint J3, via mounting 56 carried by distal arm joint J3 of robotic arm 40, so as to extend in a direction transverse to bulk article flow. Insertion tool 84, advantageously, but not necessarily, a change part, is readily and quickly integrated/disintegrated with respect to structural member 82. Insertion tool 84 is advantageously, but not necessarily, characterized by spaced apart pins 86 (e.g., tines), more particularly, spaced apart tine pairs, with bars or paddle elements likewise contemplated. As should be readily appreciated, processing of articles as small as cat food tins, and as large as 2-liter bottles pose processing challenges, with suitably outfitted and/or configured insertion tools an important processing consideration.

Figure 6:
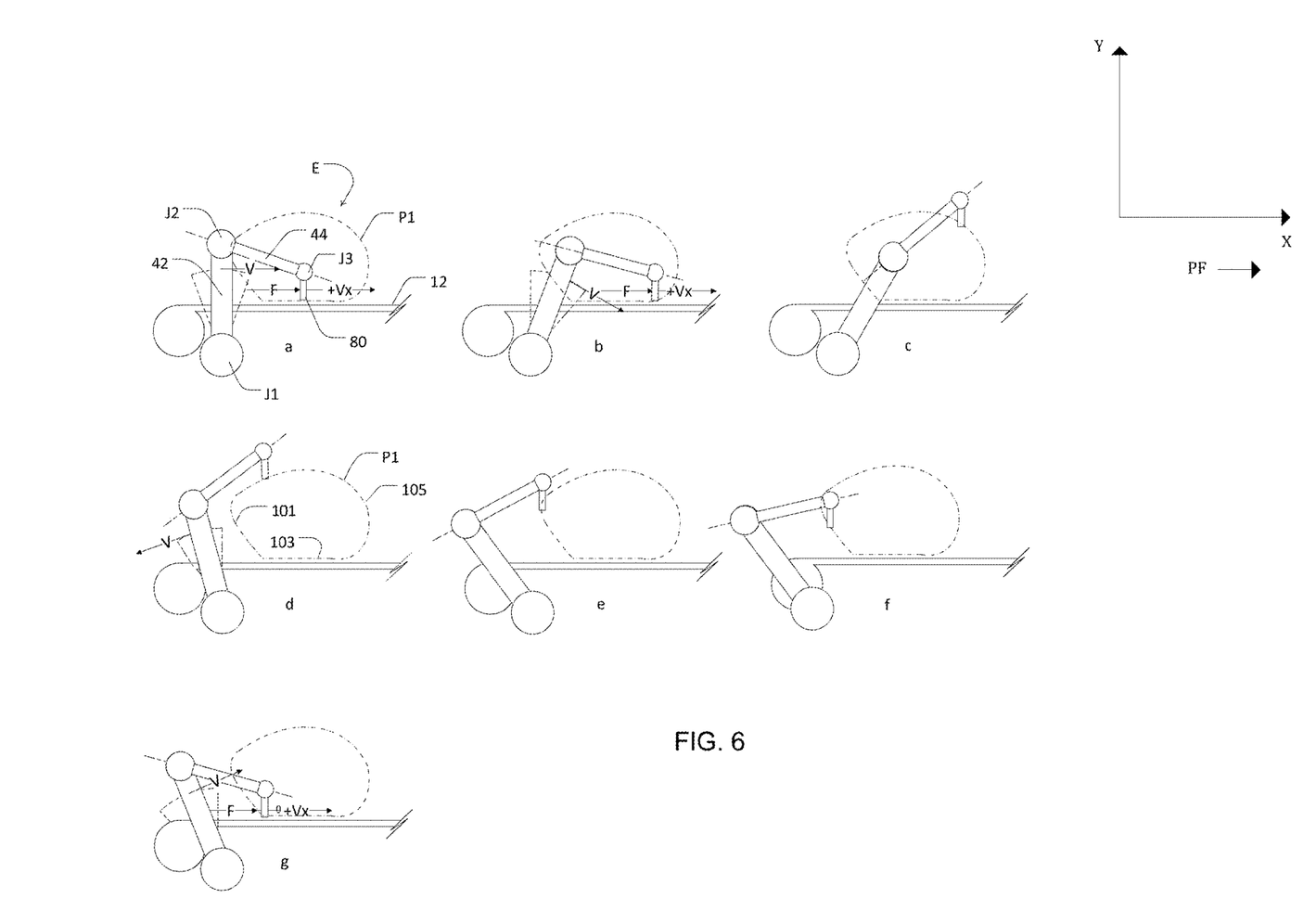

With renewed reference to FIG. 5, and select/alternate reference to FIG. 6, important operational and/or functional aspects of the contemplated article metering assembly of the article metering station are to be noted. More particularly, aspects of the end effector travel path, and robotic arm kinematics follow.

First, and in keeping with the description to this point, an advantageous end effector travel path P1 for each of the article metering assemblies is shown (FIGS. 5 & 6). As shown, path P1 is characterized by two substantially linear segments 101, 103, and a curved segment 105 which unites the free ends of the substantially linear segments.

The travel path is characterized by x and y travel components and, by a conveyed article ingress portion and a conveyed article egress portion. The end effector is cooperatively engaged with articles of the bulk flow of conveyed articles between the conveyed article ingress and egress portions. An article group from the downstream most end portion of a bulk flow of conveyed articles is delimited via introduction of the end effector into a segment of the downstream most end portion of a bulk flow of conveyed articles as a result of x-y component motion rate changes resulting in end effector travel along the conveyed article ingress portion namely, segment 101. An x travel component rate of the end effector along segment 101 substantially matches a bulk flow rate of the bulk flow of conveyed articles. A y component rate of the end effector along segment 101 is a decelerating rate.

As should be generally appreciated with reference to either FIG. 5 or FIG. 6, the end effector commences an approach toward the bulk flow of articles from above with y-motion in the direction of process flow, so as to delimit angulated substantially linear segment 101 (see panel e (FIG. 5 or 6)) and descends (panel f (FIG. 5 or 6)) for engagement with articles of the bulk flow articles. (panel g (FIG. 5 or 6)) whereupon travel transitions to horizontal substantially linear path segment 103 which extends in the direction of process flow and in a spaced apart substantially parallel condition in relation to endless belt 12 (i.e., the deck thereof).

Transitions at the opposing ends of horizontal travel path segment 103 correspond to or delimit hold/engage and release/disengagement postures for the robotic arms of the paired article metering assemblies, more particularly, a first end effector is positioned as panel b as a second end effector positioned as panel g. Via a zero contact force release for the end effector at/during its disengagement posture, sure, swift and reliable article group release is effectuated.

As the end effector is metering its group ahead of the force between it and the leading edge of the bulk flow of articles, and as the sweep conveyor surge in relation to the article group upon the end effector imparts an acceleration on the group, in furtherance of distancing the group form the bulk flow, the end effector advantageously accelerates so as match the group acceleration. Moreover, and advantageously, matching the frictional acceleration of the group allows release of the end effector from the group with minimal/no chance of back tipping of the articles. Further still, the end effector is released or disengaged from the article group in advance of the group achieving a full or maximum sweep conveyor speed so as to reduce the horizontal component of the 2D displacement of the end effector.

Second, with regard to robotic arm kinematics, and with reference to the panel sequence of FIG. 5, surge force F produces torque primarily in J1 at panel a, the end effector at a mid-way travel point along horizontal substantially linear segment 103 of travel path P1. Speed and acceleration in the x-direction are produced by J1 with the swing of J1 naturally producing the desired trajectory. Thereafter (panel b), surge force F maintains torque primarily in J1, with speed and acceleration produced/imparted by J1. Velocity at the end of this travel segment portion maintains or furthers motion in the desired x-direction, with a y-direction component pending to effectuate a lift motion for the end effector.

In the beginning of the return motion (panel c), J1 and J2 share load and path following responsibility. Here it can be seen that both J1 and J2 both contribute to motion in the x-direction. J2 motion is to lift as it follows the trajectory path, and to counter the J1 downward motion. At this point, J1 is poised to produce a large return velocity in the −x-direction. With the robotic arm returning the end effector at high speed (panel d), J1 is the dominant mover, positioned to maximize the Vx velocity component because the tangent velocity of the arm is co-linear with the tangent velocity of the path. Inertia at J1 is at minimum because arm 44 is tucked up close to J1 with the minimization of inertia greatly reducing motor torque in this position.

As the end effector readies for its substantial linear descent (panel e), again J2 is the dominant mover, however, gravity is assisting and insertion speed is low. J1 is poised to begin matching the stream velocity. As the end effector commences product stream engagement (panel f), x-direction velocity matches that of the product stream velocity with J1 primarily producing the speed in the x-direction while J2 primarily produces the motion in the y-direction. Finally (panel g), surge force F produces torque primarily on J1 with negligible torque on J2. This condition effectively utilizes the larger motor associated with J1 to manage product surge and maintain product stream rate. Speed and acceleration are produced by J1 with the swing thereof naturally producing the desired trajectory.

With reference now to FIG. 6, robotic kinematics for the depicted alternate robotic arm configuration or arrangement are presented. As the case in the FIG. 5 arrangement, surge force F produces torque primarily in J1 at panel a, the end effector at a mid-way travel point along the horizontal substantially linear segment of travel path P1. Speed and acceleration in the x-direction are produced by J1 with the swing of J1 naturally producing the desired trajectory. Thereafter (panel b), surge force F maintains torque primarily in J1, with speed and acceleration produced thereby. Velocity at the end of the horizontal path segment produces motion in the desired x direction, however, motion commences in a down direction while path trajectory is commencing upward in contradistinction to the FIG. 5 arrangement kinematics. Here the robotic arm configuration is less than ideal for transitioning to a lift motion, with the trajectory requiring J1 to swing further causing greater downward motion which J2 will have to counter act in furtherance of obtaining the desired trajectory lift.

In the beginning of the return motion (panel c), J1 and J2 do not share load and path following responsibility. Here it can be seen that J1 is carrying a heavy inertial load as arm 44 is fully extended in relation to J2. In this position, only J1 can produce motion in Vx since arm 44 is in full extension and cannot back flex, with J2 having essentially had to switch direction during this relatively high speed portion of travel. The robot is configured or arranged such that it is impossible for joints J1 and J2 to share the work/load to produce the desired trajectory. With the robotic arm returning the end effector at high speed (panel d), J1 is the dominant mover, positioned to maximize the Vx velocity component. Inertia at J1 remains high, owing to lower arm 44 in an extended condition, with high J1 motor torque resulting.

As the end effector readies for its substantial linear descent (panel e), again J2 is the dominant mover, however, gravity is assisting and insertion speed is low. J1 is poised to begin matching the stream velocity. As the end effector commences product stream engagement (panel f), x-direction velocity matches that of the product stream velocity with J1 primarily producing the speed in the x-direction while J2 primarily produces the motion in the y-direction. Finally (panel g), surge force F produces torque primarily on J1 with negligible torque on J2. This condition effectively utilizes the larger motor associated with J1 to manage product surge and maintain product stream rate. Speed and acceleration are produced by J1 with the swing thereof naturally producing the desired trajectory.

Advantageously, but hardly necessarily, the contemplated metering station and the apparatus/assemblies thereof are part-and-parcel of case packaging operations characterized by Contour™ tray packers from Applicant Douglas Machine, Inc., MN, USA, with further, additional, supplemental processing via a recirculation conveyor and Smart-rak® II flood feed type infeed likewise contemplated. Abandoning pins from below, the contemplated dual SCARA metering approach offers greater flexibility by permitting a readily adjustable working envelope (i.e., travel path for the end effector). Moreover, the contemplated robotic arm motion provides uninterrupted article flow.

Articles contemplated include, but are not limited to, loose, rigid, and non-compressible cylindrical products, e.g., and without limitation, cans carbonated bottles and glass, with product diameters and heights generally falling within a range of about 2.5-8 inches for the former, and about 1.75-12 inches for the latter. Article group size ranges, direction of travel x vertical x cross machine, are generally within a range of about 5×3×8.5 to 15.75×12×22 inches.

Via the afore described, disclosed and/or depicted metering station, proper pin insertion and product separation are readily achieved, with general cycle rates within a range of about 60-80 cycles/min, with rates up to at least 105 cycles/min achievable. The open, overhead design provides improved access to customer product and fewer machine components, as well as ease of cleaning in furtherance of reducing potential article contamination.

While advantageous, non-limiting systems, apparatus, devices, mechanisms, methods, etc. relating to collating and metering articles of a bulk flow of articles are depicted, described and/or readily ascertained with reference to the instant disclosure, alternate not insubstantial functional equivalents are likewise contemplated to effectuate a desirable low cost robotic approach to such process. Presently known and future developed means for effectuating the noted functionalities are understood to be within the scope of the instant disclosure.

Thus, since the structures of the assemblies/mechanisms disclosed herein may be embodied in other specific forms without departing from the spirit or general characteristics thereof, some of which forms have been indicated, the embodiments described and depicted herein/with are to be considered in all respects illustrative and not restrictive. Accordingly, the scope of the subject invention is as defined in the language of the appended claims, and includes not insubstantial equivalents thereto.

That which is claimed:

1. An article metering assembly for forming an article group from a downstream most end portion of a bulk flow of conveyed articles comprising a robotic arm, a linkage assembly, and an end effector operatively united with said robotic arm and said linkage assembly such that said end effector is fixedly orientated relative to the bulk flow of articles throughout a robotic arm motion cycle, said robotic arm characterized by first and second arm segments and proximal, intermediate and distal arm joints, said first arm segment extending between said proximal arm joint and said distal arm joint, said second arm segment extending between said intermediate arm joint and said distal arm joint wherein elevation changes for said end effector, relative to the bulk flow of conveyed articles, are effectuated by said robotic arm, an orientation for said end effector effectuated by said linkage assembly.

2. The article metering assembly of claim 1 wherein said end effector is supported at said distal arm joint.

3. The article metering assembly of claim 1 wherein said end effector extends from said distal arm joint.

4. The article metering assembly of claim 1 wherein said end effector is supported at said distal arm joint, said distal arm joint being pivotable relative to/about said end effector upon pivoting of said second arm segment about said intermediate arm joint.

5. The article metering assembly of claim 1 wherein said end effector comprises an insertion tool.

6. The article metering assembly of claim 1 wherein said end effector comprises a forked insertion tool.

7. The article metering assembly of claim 1 wherein said end effector comprises a bar.

8. The article metering assembly of claim 1 wherein said end effector comprises a paddle.

9. The article metering assembly of claim 1 wherein said end effector comprises an insertion tool having spaced apart pins.

10. The article metering assembly of claim 1 wherein said end effector comprises a structural member and an insertion tool depending therefrom.

11. The article metering assembly of claim 1 wherein said end effector comprises a structural member and an insertion tool depending therefrom, said insertion tool being a change part.

12. The article metering assembly of claim 1 wherein said end effector comprises a structural member and an insertion tool depending therefrom, said insertion tool having spaced apart pins.

13. The article metering assembly of claim 1 wherein said end effector comprises a structural member and an insertion tool depending therefrom, said insertion tool having spaced apart pin pairs.

14. The article metering assembly of claim 1 wherein said distal arm joint includes a bearing set, said end effector operatively extending from said bearing set.

15. The article metering assembly of claim 1 wherein said distal arm joint is downstream of said proximal arm joint relative to a process flow direction for the bulk flow of conveyed articles.

16. The article metering assembly of claim 1 wherein said proximal arm joint is upstream of a working envelope for said robotic arm.

17. The article metering assembly of claim 1 wherein said proximal arm joint is downstream of said distal arm joint relative to a process flow direction for the bulk flow of conveyed articles.

18. The article metering assembly of claim 1 wherein said proximal arm joint is downstream of a working envelope for said robotic arm.

19. The article metering assembly of claim 1 wherein said robotic arm is arranged in relation to the bulk flow of conveyed articles such that said proximal arm joint is at an elevation there above.

20. The article metering assembly of claim 1 wherein said robotic arm is arranged in relation to the bulk flow of conveyed articles such that said proximal arm joint is at an elevation there below.

21. An article metering assembly for forming an article group from a downstream most end portion of a bulk flow of conveyed articles comprising a robotic arm, a linkage assembly, and an end effector operatively united with said robotic arm and said linkage assembly such that said end effector is fixedly orientated relative to the bulk flow of articles throughout a robotic arm motion cycle, said robotic arm characterized by first and second arm segments and proximal, intermediate and distal arm joints, said first arm segment extending between said proximal arm joint and said distal arm joint, said second arm segment extending between said intermediate arm joint and said distal arm joint, said linkage assembly comprising link segments fixedly supported by said robotic arm at arms joints thereof.

22. An article metering assembly for forming an article group from a downstream most end portion of a bulk flow of conveyed articles comprising a robotic arm, a linkage assembly, and an end effector operatively united with said robotic arm and said linkage assembly such that said end effector is fixedly orientated relative to the bulk flow of articles throughout a robotic arm motion cycle, said robotic arm characterized by first and second arm segments and proximal, intermediate and distal arm joints, said first arm segment extending between said proximal arm joint and said distal arm joint, said second arm segment extending between said intermediate arm joint and said distal arm joint, said linkage assembly comprising a central link fixedly supported by said robotic arm at said intermediate arm joint.

23. An article metering assembly for forming an article group from a downstream most end portion of a bulk flow of conveyed articles comprising a robotic arm, a linkage assembly, and an end effector operatively united with said robotic arm and said linkage assembly such that said end effector is fixedly orientated relative to the bulk flow of articles throughout a robotic arm motion cycle, said robotic arm characterized by first and second arm segments and proximal, intermediate and distal arm joints, said first arm segment extending between said proximal arm joint and said distal arm joint, said second arm segment extending between said intermediate arm joint and said distal arm joint, said linkage assembly comprising links fixedly supported by said robotic arm at arms joints thereof, a central link fixedly supported by said robotic arm at said intermediate arm joint, a distal link supported by said robotic arm at said distal arm joint.

24. An article metering assembly for forming an article group from a downstream most end portion of a bulk flow of conveyed articles comprising a robotic arm, a linkage assembly, and an end effector operatively united with said robotic arm and said linkage assembly such that said end effector is fixedly orientated relative to the bulk flow of articles throughout a robotic arm motion cycle, said robotic arm characterized by first and second arm segments and proximal, intermediate and distal arm joints, said first arm segment extending between said proximal arm joint and said distal arm joint, said second arm segment extending between said intermediate arm joint and said distal arm joint, said linkage assembly comprising a first pivotable link, a second pivotable link, a central link, and a distal link, said central link fixedly supported by said robotic arm at said intermediate arm joint, said distal link fixedly supported by said robotic arm at said distal arm joint.

25. An article metering assembly for forming an article group from a downstream most end portion of a bulk flow of conveyed articles comprising a robotic arm, a linkage assembly, and an end effector operatively united with said robotic arm and said linkage assembly such that said end effector is fixedly orientated relative to the bulk flow of articles throughout a robotic arm motion cycle, said robotic arm characterized by first and second arm segments and proximal, intermediate and distal arm joints, said first arm segment extending between said proximal arm joint and said distal arm joint, said second arm segment extending between said intermediate arm joint and said distal arm joint, said linkage assembly comprising a pivotable link operatively supported in said linkage assembly so as to maintain a parallel spaced apart condition for said pivotable link with an arm segment of said lower and upper arm segments.

26. An article metering assembly for forming an article group from a downstream most end portion of a bulk flow of conveyed articles comprising a robotic arm, a linkage assembly, and an end effector operatively united with said robotic arm and said linkage assembly such that said end effector is fixedly orientated relative to the bulk flow of articles throughout a robotic arm motion cycle, said robotic arm characterized by first and second arm segments and proximal, intermediate and distal arm joints, said first arm segment extending between said proximal arm joint and said distal arm joint, said second arm segment extending between said intermediate arm joint and said distal arm joint, said linkage assembly comprising a pivotable link operatively supported in said linkage assembly so as to maintain a parallel spaced apart condition for said pivotable link with said upper arm segment.

27. An article metering assembly for forming an article group from a downstream most end portion of a bulk flow of conveyed articles comprising a robotic arm, a linkage assembly, and an end effector operatively united with said robotic arm and said linkage assembly such that said end effector is fixedly orientated relative to the bulk flow of articles throughout a robotic arm motion cycle, said robotic arm characterized by first and second arm segments and proximal, intermediate and distal arm joints, said first arm segment extending between said proximal arm joint and said distal arm joint, said second arm segment extending between said intermediate arm joint and said distal arm joint, said linkage assembly comprising a pivotable link operatively supported in said linkage assembly so as to maintain a parallel spaced apart condition for said pivotable link with said lower arm segment.

28. An article metering assembly for forming an article group from a downstream most end portion of a bulk flow of conveyed articles comprising a robotic arm, a linkage assembly, and an end effector operatively united with said robotic arm and said linkage assembly such that said end effector is fixedly orientated relative to the bulk flow of articles throughout a robotic arm motion cycle, said robotic arm characterized by first and second arm segments and proximal, intermediate and distal arm joints, said first arm segment extending between said proximal arm joint and said distal arm joint, said second arm segment extending between said intermediate arm joint and said distal arm joint, said linkage assembly comprising a first pivotable link operatively supported in said linkage assembly so as to maintain a parallel spaced apart condition for said first pivotable link with said upper arm segment, and a second pivotable link operatively supported in said linkage assembly so as to maintain a parallel spaced apart condition for said second pivotable link with said lower arm segment.

29. An article metering assembly for forming an article group from a downstream most end portion of a bulk flow of conveyed articles comprising a robotic arm, a linkage assembly, and an end effector operatively united with said robotic arm and said linkage assembly such that said end effector is fixedly orientated relative to the bulk flow of articles throughout a robotic arm motion cycle, said robotic arm characterized by first and second arm segments and proximal, intermediate and distal arm joints, said first arm segment extending between said proximal arm joint and said distal arm joint, said second arm segment extending between said intermediate arm joint and said distal arm joint, each of said first and said second arm segments being independently driven for pivot motion by drive assemblies.

30. An article metering assembly for forming an article group from a downstream most end portion of a bulk flow of conveyed articles comprising a robotic arm, a linkage assembly, and an end effector operatively united with said robotic arm and said linkage assembly such that said end effector is fixedly orientated relative to the bulk flow of articles throughout a robotic arm motion cycle, said robotic arm characterized by first and second arm segments and proximal, intermediate and distal arm joints, said first arm segment extending between said proximal arm joint and said distal arm joint, said second arm segment extending between said intermediate arm joint and said distal arm joint, said end effector travelling through a portion of said robotic arm motion cycle during downstream release of a formed article group such that an acceleration of said end effector substantially matches an acceleration of the formed article group.

31. An article metering apparatus for forming an article group from a downstream most end portion of a bulk flow of conveyed articles comprising synchronously operated article metering assemblies, each article metering assembly of said article metering assemblies comprising:
   a. a robotic arm characterized by a pivoting upper arm segment, a pivoting lower arm segment, and a joint uniting the arm segments, said pivoting upper arm segment depending from a support member;
   b. a linkage assembly characterized by an upper link, a central link, and a lower link portion, said central link supported by said robotic arm at said joint, said upper link pivotingly extending, in a spaced apart parallel condition relative to said pivoting upper arm segment, between said support member and said central link; and,
   c. an insertion tool operatively supported by said robotic arm and operatively united to said lower link portion of said link assembly, said insertion tool having a fixed orientation relative to articles of the bulk flow of conveyed articles during operation of said robotic arm.

32. An article metering assembly for forming an article group from a downstream most end portion of a bulk flow of conveyed articles, said article metering assembly comprising a robotic arm, an end effector operatively united with said robotic arm, and a controller operatively linked to said robotic arm in furtherance of establishing a travel path for said end effector, said robotic arm including first and second arm segments and proximal, intermediate and distal arm joints, said first arm segment extending between said proximal arm joint and said distal arm joint, said second arm segment extending between said intermediate arm joint and said distal arm joint, the travel path including a travel path segment spaced apart from and substantially parallel with the downstream most end portion of the bulk flow of conveyed articles, said end effector travelable along said travel path segment substantially parallel with the downstream most end portion of the bulk flow such that an acceleration for said end effector substantially matches an acceleration of a formed article group during travel along an end portion of said travel path segment spaced apart from and substantially parallel with the downstream most end portion of the bulk flow of conveyed articles.

33. A robotic article collation and metering method characterized by paired selective compliance assembly robot arms, each arm of the selective compliance assembly robot arms equipped with an end effector, each end effector selectively and alternately engaging a downstream most end portion of a bulk flow of conveyed articles from above in furtherance of forming and releasing an article group from the downstream most end portion of a bulk flow of conveyed articles, the method comprising:
  a. providing a control unit operatively linked with the paired selective compliance assembly robot arms in furtherance of establishing a select travel path for the end effector of the robotic arm and rates of travel for the end effector about the select travel path;
  b. establishing a select travel path for the end effector of the robotic arm characterized by x and y travel components, the select travel path characterized by a conveyed article ingress portion and a conveyed article egress portion for the end effector, the end effector cooperatively engaged with articles of the bulk flow of conveyed articles between the conveyed article ingress and egress portions; and,
  c. delimiting an article group from the downstream most end portion of a bulk flow of conveyed articles via introduction of the end effector into a segment of the downstream most end portion of a bulk flow of conveyed articles as a result of end effector travel along the conveyed article ingress portion, an x travel component rate of the end effector along the conveyed article ingress portion substantially matching a bulk flow rate of the bulk flow of conveyed articles, a y component rate of the end effector along the conveyed article ingress portion being a decelerating rate.

* * * * *